July 25, 1939. A. L. CHRISTIANSEN 2,166,939
FISH CUTTING AND CLEANING MACHINE
Filed April 1, 1935    3 Sheets-Sheet 1

INVENTOR.
ANDREW L. CHRISTIANSEN.
BY William E. Hall
ATTORNEY

July 25, 1939.  A. L. CHRISTIANSEN  2,166,939
FISH CUTTING AND CLEANING MACHINE
Filed April 1, 1935   3 Sheets-Sheet 2

INVENTOR.
ANDREW L. CHRISTIANSEN
BY
ATTORNEY

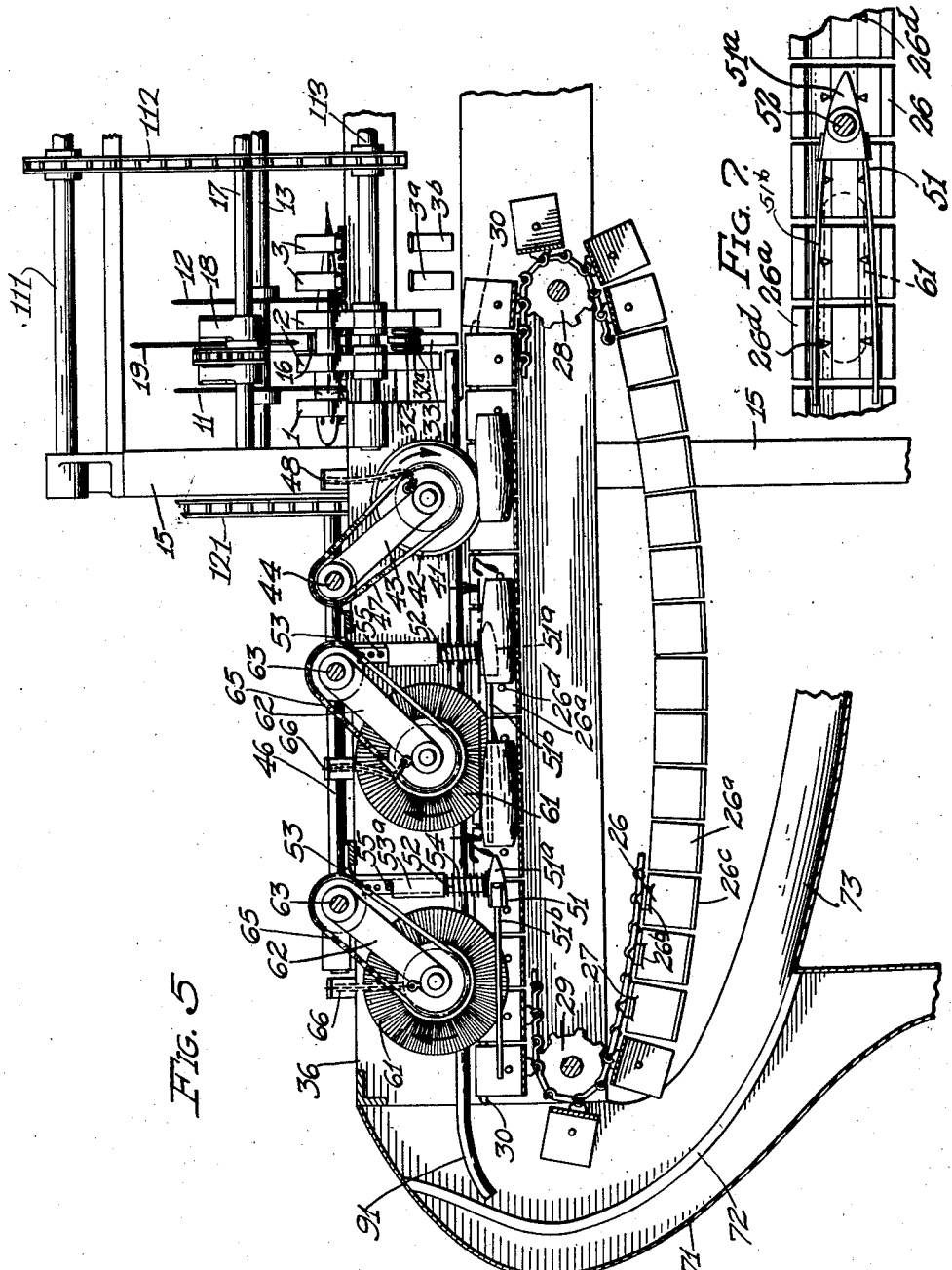

Patented July 25, 1939

2,166,939

UNITED STATES PATENT OFFICE 2,166,939

FISH CUTTING AND CLEANING MACHINE

Andrew L. Christiansen, Willowbrook, Calif.

Application April 1, 1935, Serial No. 14,052

16 Claims. (Cl. 17—3)

My invention relates to fish machines, and particularly to fish cutting and cleaning machines.

The objects of my invention are:

First, to provide a combination of synchronized conveyors for conveying transversely fish to be cut into lengths, and in which one of the conveyors extends beyond the other for conveying the fish sections therein beyond the fish sections in the other conveyor, whereby the former sections, ordinarily discarded, are saved for packing with the others;

Second, to provide a novel pocket conveyor, which is particularly simple and economical of construction, and such a conveyor in combination with novelly arranged length-cutting knives;

Third, to provide a novelly arranged knife in addition to the usual length-cutting knives which may be easily brought into use when desired for additionally dividing the fish lengths;

Fourth, to provide a machine of this class whereby the fish are cut to length before the entrails are removed, thereby facilitating the latter operation and the handling of the fish;

Fifth, to provide novel and simple means for turning the fish on their backs, and particularly such a means in combination with novelly arranged conveyors whereby the fish are directly discharged from one conveyor into the other on their backs and in the desired direction;

Sixth, to provide novel and efficient cutting means for splitting the bellies of fish of different sizes, and which is so arranged that the cutting means rides directly upon the fish of different sizes and cuts substantially only the thin belly wall of the fish;

Seventh, to provide novel and simple means for spreading the opposite walls of the fish while cleaning out the entrails from the bellies of the fish;

Eighth, to provide a novelly mounted brush for removing the entrails of fish of different sizes, and which automatically accommodates itself to the different size fish;

Ninth, to provide novel and simple means of separating the entrails from the cleaned fish; and, Tenth, to provide a simple and economical method of cutting and cleaning fish.

Figures 1, 6:
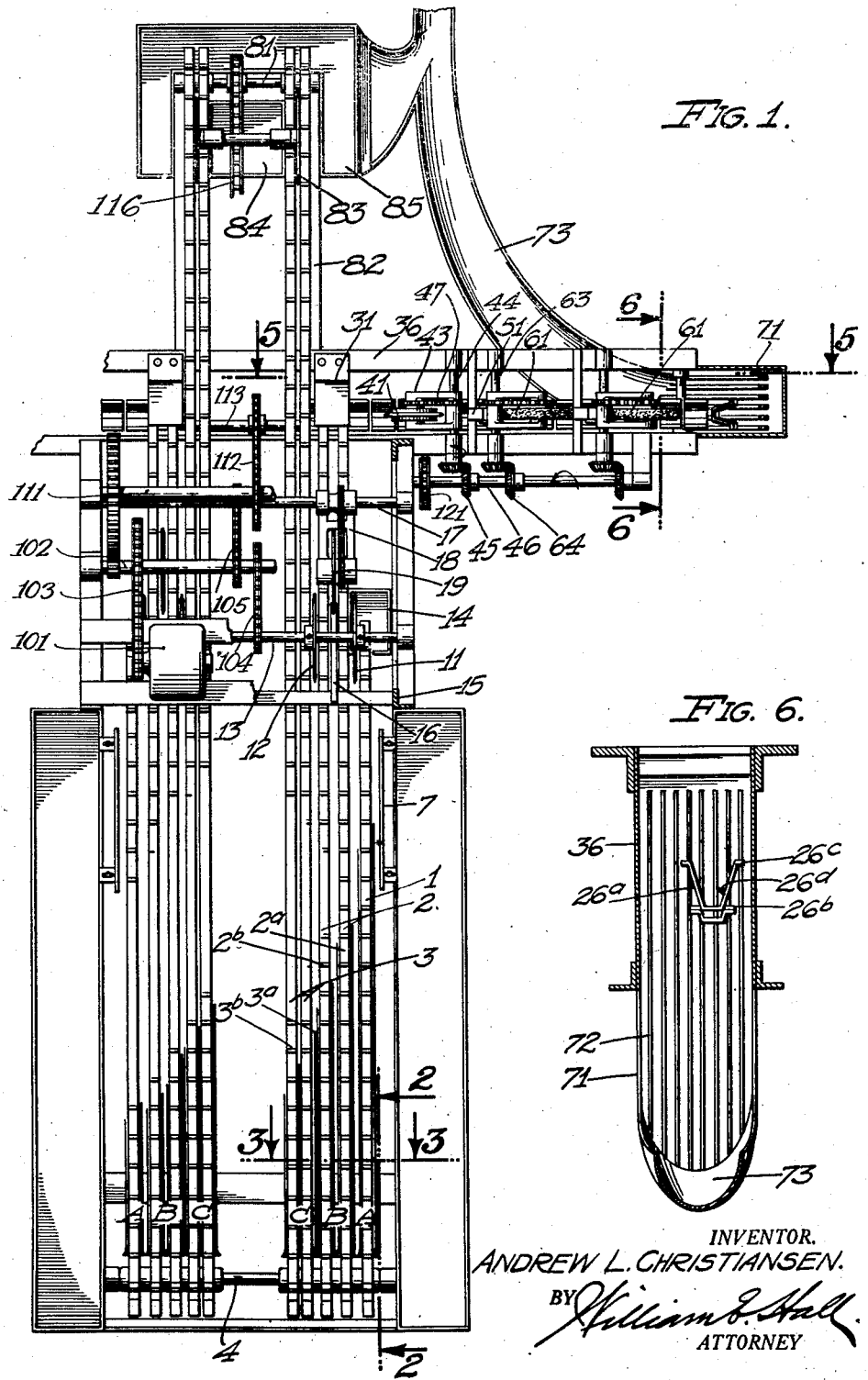
Figure 2:
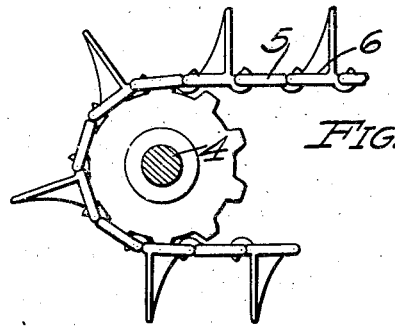
Figure 3:
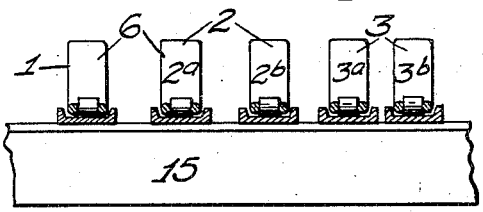
Figure 4:
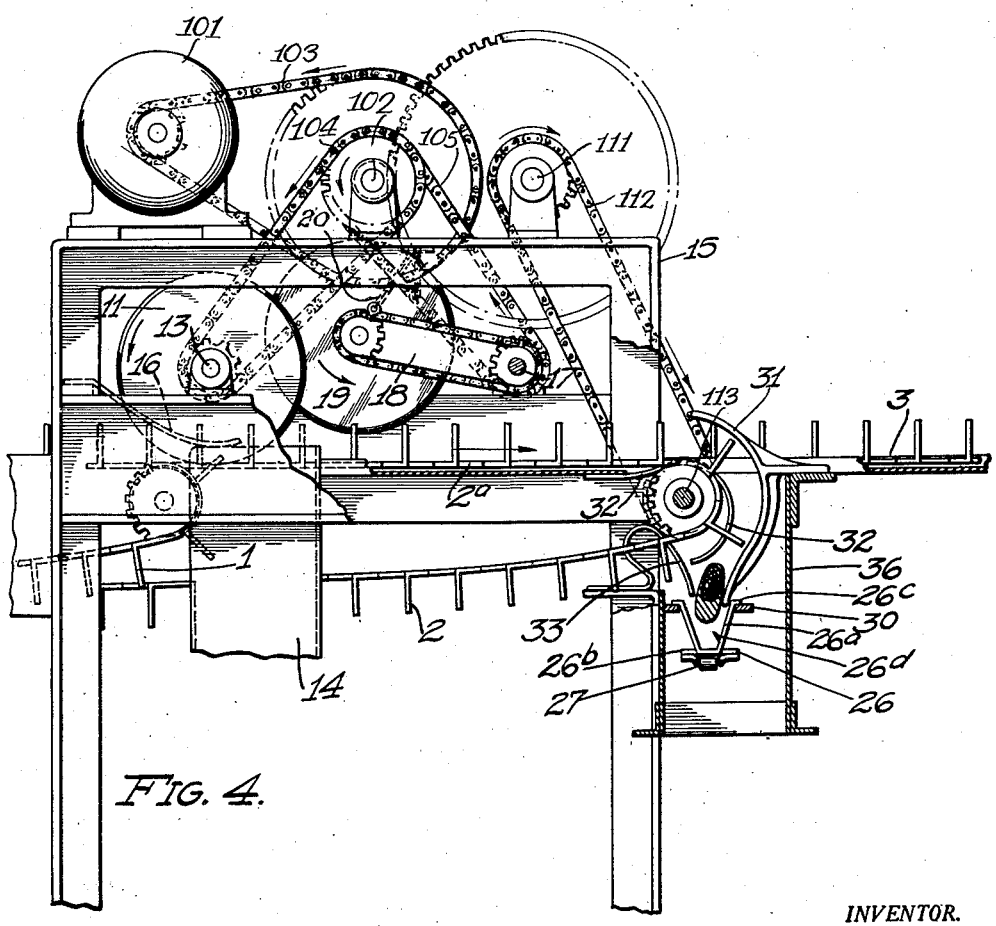

With these and other objects in view, as will appear hereinafter, I have devised a fish machine, having certain novel features of construction, as will be hereinafter described in detail and particularly set forth in the appended claims, reference being had to the accompanying drawings and to the characters of reference thereon, in which:

Fig. 1 is a fragmentary plan view of my machine in its preferred form, portions being broken away and in section to facilitate the illustration; Figs. 2 and 3 are enlarged sectional elevations taken at 2—2 and 3—3 of Fig. 1, showing the fish conveyor construction and mounting; Fig. 4 is a fragmentary enlarged side elevation, showing particularly the cutters and the means for transferring and turning the fish when deposited in the cleaning conveyor; Fig. 5 is a fragmentary enlarged section taken at 5—5 of Fig. 1 showing the means for splitting and cleaning the fish and for separating the entrails from the cleaned fish; Fig. 6 is an enlarged sectional elevation of the means for separating the entrails from the cleaned fish; and Fig. 7 is an enlarged sectional view in plan, taken through 7—7 of Fig. 5, showing the fish spreading means.

I have shown fragmentarily a double machine in which one side is a duplicate of the other, but I shall refer herein to one side only.

The machine, in its preferred embodiment, is provided with three conveyors 1, 2, and 3. The receiving ends of all the conveyors are mounted on a shaft 4, while the opposite or discharge ends are at different distances from the receiving ends, the conveyor 3 extending beyond the conveyor 2 and the latter beyond the conveyor 1. The conveyor 1 consists of one, while each of the conveyors 2 and 3 consists of a pair of continuous link belts 2a, 2b and 3a, 3b. These link belts, as shown, consist of alternate plain links 5, and links 6 having outwardly extending brackets, as shown best in Fig. 2. On the upper sides of these belts the adjacent brackets provide pockets indicated as A, B, and C in the conveyors 1, 2, and 3. These conveyors are all synchronized with the pockets of each conveyor aligned, as shown, for receiving and conveying a fish cross-wise, flat-wise, with the back forward and with the head extending in front of or beyond the conveyor 1 and with the tail end in the conveyor 3. For smaller fish, the links 5 may be omitted, and for larger fish other links 5 may be added.

At the outerside of the conveyor 1 may be adjustably mounted a limiting guide 7 against which the heads of the fish, to be carried in the conveyor pockets, may be placed.

Intermediate the ends of the conveyors 1 and 2 are cutters 11 and 12 which are preferably circular knives, mounted on a transverse shaft 13, at the opposite sides of the conveyor belts 2a and 2b, and extend below the pockets. These cutters are adjustably mounted on the shaft for varying the length of the sections cut. These cutters cut off the heads, which drop off the side of the conveyor 1 down the chute 14, and also the tail end sections, which are carried by the conveyor 3, as will be described hereafter.

On the frame 15 is mounted a leaf spring 16, or in substance a retaining member resiliently mounted on the frame. This member 16 extends angularly downwardly between the conveyor belts 2a and 2b and holds the fish fixed in the pockets while the head and tail ends are removed.

On the frame 15 is mounted another transverse shaft 17 on which is pivoted a cutter frame 18 at the free end of which is rotatably mounted a cutter or knife 19. This knife is raised when not in use, but lowered to the position shown when desired for dividing the fish section cut by knives 11 and 12. When lowered this knife 19 is positioned between the conveyor belts 2a and 2b and is limited by a suitable stop 20.

The aforementioned conveyors, shafts, and knives are shown operated by a motor 101 which rotates a shaft 102 through a chain 103. This shaft rotates the cutter shafts 13 and 17 through chains 104 and 105 respectively. On the frame is also mounted a shaft 111 driven through gears by the shaft 102. The shaft 111 rotates the conveyor shaft 113 through a chain 112, thereby moving the conveyor 2 in the direction of the arrow. The drive mechanism is for the most part shown only diagrammatically. The conveyor 1 is synchronized with the conveyor 2 but the drive mechanism for the former is not shown.

The shaft 81, for driving the sprockets for the conveyor 3, is rotated by a chain 116 from the shaft 111, the connection not being shown.

Immediately below the conveyor 2, is an endless belt conveyor 26 which extends outwardly at right angles therefrom, and carries the middle or belly sections of the fish to the side for purposes hereinafter described. This conveyor consists of a plurality of V-shaped pocket members 26a having at their lower portions laterally extending ears 26b which are secured to the links of a link belt 27 mounted on sprockets 28 and 29. At the upper portions of the pocket members (i. e. when the pocket members 26a are at the upper side of the conveyor) are other laterally extending lugs 26c which ride upon and support the conveyor on solid horizontal guides 30. The V-shaped pocket members 26a at the upper side of the conveyor provide a longitudinal channel, parallel to the pockets in the conveyor 2, for receiving the belly sections from the latter.

The conveyor 26 is enclosed in a long housing 36 extending cross-wise of the machine.

Over the discharge end of the conveyor 2 is positioned a semicircular guide 31 which is mounted on the housing 36. One end of the guide extends substantially into the pocket members of the conveyor 26, as shown in Fig. 4. On the frame, between the conveyor belts 2a and 2b, is secured one end of a leaf spring 32 which is spaced inwardly from and substantially conforms to the contour of but slightly approaches the semi-circular guide 31. This spring causes the cut belly sections of the fish to be gradually forced from the pockets in the conveyor 2 flatwise against the guide 31 with the backs foremost, and to be deposited in substantially such position into the channel of the conveyor 26. The spring 32 may consist of a plurality of small springs placed side by side, as shown. The outer springs 32a are more flexible and preferably positioned closer to the guide 31 for holding the smaller fish against the guide. The outer springs 32a may be positioned at the outer sides of the conveyor belts 2a and 2b. As the fish sections leave the guide 31, there is a tendency of the fish rolling over. To prevent such tendency, I have provided a second leaf spring 33 which is secured at one end on the frame and has an upwardly directed goose-neck at the opposite end. The free end is positioned immediately beyond the end of the space between the guide 31 and the spring 32, as shown in Fig. 4.

The pocket members 26a are provided with prongs or spurs 26d which are adapted to pierce and hold the fish when they are forced into the channel of the conveyor, as will be described hereafter.

Above the conveyor 26 are positioned in sequence a belly-splitting cutter 41, a fish-side-wall spreader 51 and an entrail remover 61. These are all supported by and enclosed in the housing 36.

The belly-splitting cutter consists of a circular knife in vertical alignment with the channel and provided at the opposite sides with shoulder discs 42 of slightly smaller diameter, i. e. spaced backwardly slightly from the cutting edge of the knife, as shown best in Figs. 1 and 5. The knife is rotatably mounted in a frame 43 which is pivoted on the shaft 44. The shaft is connected, by level gears 45, to a drive shaft 46. This drive shaft 46 is driven through a chain 121 by the shaft 102, the latter connection not being shown. The knife is driven by a chain 47 from the shaft 44.

The knife drops down freely, limited only by a stop in the form of a chain 48, into the channel of the conveyor, and splits the bellies of the fish located by the pocket members 26a. The shoulder discs 42 are adapted to ride upon the fish in the channel of the conveyor and thus limit the penetration of the knife into the fish.

The spreader consists of a pointed nose member 51a, with the point directed toward the approaching split fish sections, and resilient wire arms 51b which diverge backwardly therefrom toward the sides of the channel, as shown in Fig. 7. As the split fish are carried along by the conveyor, the pointed nose piece enters the fish, and as the fish advances the sides are spread by the diverging arms 51b.

This spreader has an upwardly extending shank 52 which slides in a vertical socket 53a of a support 53. The spreader is resiliently forced downwardly by a spring 54 and limited in its downward movement by a pin 55. The spreader thus adjusts itself to varying sizes of at least one species of fish. For different species, the spreader may be raised or lowered manually by adjusting the pin 55.

The entrail remover 61 consists of a narrow circular brush positioned in vertical alignment with the channel and rotatably mounted at the lower free end of a frame 62 which is pivoted at its opposite end on a shaft 63. This shaft is also connected by bevel gears 64 to the drive shaft 46. The brush is rotated by a chain 65 from the shaft 63. The brush also drops down freely into the channel and is limited by a chain 66.

The brush drops freely between a pair of spreader arms 51b, so that as the side walls of the fish are spread as the fish is advanced by the conveyor 26, the brush, sufficiently sensitive to be raised by the fish, enters the fish and brushes out the entrails towards the discharge end of the conveyor.

It will be noted that the supporting frames for the brushes are inclined from their pivotal supports in the direction of the moving conveyor 26 and that the chain drives for the brushes are so arranged that as the brushes are rotated they tend to rise, making the mounting particularly sensitive, so that the brushes are easily raised by the fish in the conveyor 26.

There may be one or more of such units, of spreader and brush, completely to remove the entrails, as shown.

At the discharge end of the conveyor 26 is a downwardly and backwardly curved guard plate or chute 71 in front of which is spaced a grid 72. The entrails are thrown by the last brush through the grid into the chute while the cleaned fish are discharged by the conveyor on to the grid, from which they roll or slide down into a chute 73.

The conveyor 3 extends beyond and in front of the frame 15 and housing 36, and around a drive shaft 81 mounted at the outer end of an extension frame 82. Between and near the discharge ends of conveyor belts 3a and 3b of this conveyor is a circular knife 83 which severs the tail from the meat portion, the former dropping into a chute 84 and the latter into a chute 85 which may be joined with the chute 73, thus assembling all edible portions of the fish.

It will be here noted that streams of water are directed on the fish at various parts of the machine to facilitate the several operations. But such streams of water are here shown only in connection with the conveyor 26 and the splitting, spreading, cleaning and separating means, and supplied by a conduit designated 91.

Though I have shown and described a particular construction, I do not wish to be limited to the same, but desire to include in the scope of my invention the construction, combination and arrangement substantially as set forth in the appended claims.

I claim:

1. In a machine of the class described, a conveyor for carrying fish transversely, a pair of spaced knives at the outer sides thereof for cutting off the head and tail ends from the entrail sections of the fish, a knife adapted to ride lengthwise upon the entrail sections for splitting lengthwise the belly walls only of the entrail sections, the depth of the knife cut being fixed and limited by the surface of the fish upon which the knife rides, means for spreading the side walls of said sections, and means for forcing the entrails therefrom.

2. In a machine of the class described, a conveyor for receiving fish on their sides and for carrying the same transversely, a pair of spaced knives at the outer sides thereof for cutting off the head and tail ends from the middle sections of the fish, means for turning said middle sections on their backs, a knife adapted to ride lengthwise upon the entrail sections for splitting lengthwise the belly walls only of said sections, the depth of the knife cut being fixed and limited by the surface of the fish upon which the knife rides, means for spreading the side walls of said sections, and means for forcing the entrails therefrom.

3. In a machine of the class described, a conveyor for carrying fish transversely, a pair of spaced knives at the outer sides thereof for cutting off the head and tail ends from the middle sections of the fish, a narrow pocket conveyor mounted below one end of and at right angles to the first conveyor, means for receiving the middle sections from the first conveyor and laying the same on their backs in the pockets of the pocket conveyor, a knife for splitting lengthwise the bellies of said sections while in said pockets, means for spreading the side walls of said sections, and means for forcing the entrails therefrom.

4. In a machine of the class described, a conveyor having transverse pockets and a longitudinal opening intermediate the ends of the pockets, a pair of cutters positioned at the opposite sides of the conveyor and at the ends of the pockets, and a spring arm extending angularly into the opening, in the direction of movement and between the cutters.

5. In a machine of the class described, a conveyor having transverse pockets, a second conveyor mounted below one end of and at right angles to the first conveyor, and having a longitudinal channel positioned parallel to said pockets and adapted to receive fish sections directly therefrom, a guide extending around one end of the first conveyor and into the second conveyor, and a spring member positioned adjacent said end of the first conveyor and said guide, for gradually forcing the fish sections from the pockets against the guide, as the first conveyor is advanced, and depositing the same in said channel.

6. In a machine of the class described, a conveyor having transverse pockets, a second conveyor mounted below one end of and at right angles to the first conveyor, and having a longitudinal channel positioned parallel to said pockets and adapted to receive fish sections directly therefrom, a guide extending around one end of the first conveyor and into the second conveyor, a spring member positioned adjacent said end of the first conveyor and said guide, for gradually forcing the fish sections from the pockets against the guide, as the first conveyor is advanced, and depositing the same in said channel and a second spring member having its free end positioned adjacent the exit of the space between the guide and the first spring member to facilitate placing of the fish sections in the channel with their backs downward.

7. In a machine of the class described, a conveyor having a longitudinal channel open at its top adapted to convey fish sections on their backs and split at their bellies, and a spreader comprising a pointed nose member vertically resiliently mounted and extending into the channel and directed towards approaching fish sections for entering the bellies thereof, said spreader having resilient arms diverging backwardly from said pointed nose, said arms being free at their rear ends and extending towards the sides of the channel.

8. In a machine of the class described, a conveyor, a second conveyor synchronized with the first and extending beyond the end thereof and having pockets aligned with the first conveyor, said conveyors being adapted to carry fish extending through the pockets of both conveyors, separate cutters between the conveyors and also at the outer sides of each conveyor, a third conveyor mounted below one end of and at right angles to the first conveyor, and means for transferring fish sections from the first to the third conveyors.

9. In a machine of the class described, a conveyor for conveying fish, means for removing the entrails of the fish in the conveyor and discharging the same toward the discharge end of the conveyor, a grid at the discharge end of the conveyor for receiving and separating the fish and entrails, means below the grid for receiving the entrails, and means for receiving the fish from the top of the grid.

10. In a machine of the class described, a conveyor having transverse pockets, a second conveyor mounted below one end of and at right angles to the first conveyor, and having a longitudinal channel positioned parallel to said pockets, and means for turning and depositing the fish sections from the first conveyor longitudinally into said longitudinal channel with their bellies uppermost.

11. In a machine of the class described, a conveyor having pockets, a second conveyor having a receiving channel, a guide extending around one end of the first conveyor and into the second conveyor, and a spring member positioned adjacent said end of the first conveyor and said guide, for gradually forcing the fish sections from the pockets against the guide, as the first conveyor is advanced, and depositing the same in said channel.

12. In a machine of the class described, a conveyor having pockets, a second conveyor having a receiving channel, a guide extending around one end of the first conveyor and into the second conveyor, a spring member positioned adjacent said end of the first conveyor and said guide, for gradually forcing the fish sections from the pockets against the guide, as the first conveyor is advanced, and depositing the same in said channel, and a second spring member having its free end positioned adjacent the exit of the space between the guide and the first spring member to facilitate placing of the fish sections in the channel with their backs downward.

13. In a machine of the class described, a conveyor, a second conveyor synchronized with the first and extending beyond the end thereof and having pockets aligned with the first conveyor, said conveyors being adapted to carry fish extending through the pockets of both conveyors, separate cutters between the conveyors and also at the outer sides of each conveyor, a third conveyor mounted below one end of and at right angles to the first conveyor, means for transferring fish sections from the first to the third conveyors, and means for assembling edible portions from the second and third conveyors.

14. In a machine of the class described, a conveyor, a second conveyor synchronized with the first and extending beyond the end thereof and having pockets aligned with the first conveyor, said conveyors being adapted to carry fish extending through the pockets of both conveyors, cutters at the opposite sides of the first conveyor, and another cutter in association with the second conveyor.

15. In a machine of the class described, a conveyor, a second conveyor synchronized with the first and extending beyond the end thereof and having pockets aligned with the first conveyor, said conveyors being adapted to carry fish extending through the pockets of both conveyors, cutters at the opposite sides of the first conveyor, means at the side of the first conveyor opposite the second conveyor for receiving the heads of the fish cut, another cutter in association with the second conveyor, and means in association with the latter cutter and the second conveyor for receiving the tails of the fish cut.

16. In a machine of the class described, a conveyor, a second conveyor synchronized with the first and extending beyond the end thereof and having pockets aligned with the first conveyor, said conveyors being adapted to carry fish extending through the pockets of both conveyors, separate cutters between the conveyors and also at the outer sides of each conveyor, a third conveyor mounted below one end of the first conveyor, and means for transferring fish sections from the first to the third conveyors.

ANDREW L. CHRISTIANSEN.